(12) United States Patent
Healey et al.

(10) Patent No.: US 8,572,209 B2
(45) Date of Patent: Oct. 29, 2013

(54) METHODS AND SYSTEMS FOR AUTHORING OF MIXED-INITIATIVE MULTI-MODAL INTERACTIONS AND RELATED BROWSING MECHANISMS

(75) Inventors: Jennifer A. Healey, Cambridge, MA (US); Rafah A. Hosn, Stamford, CT (US); Stephane Herman Maes, Danbury, CT (US); Thiruvilvama Lai V. Raman, San Jose, CA (US); Alpana Tiwari, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/871,571

(22) Filed: Oct. 12, 2007

(65) Prior Publication Data

US 2008/0034032 A1 Feb. 7, 2008

Related U.S. Application Data

(62) Division of application No. 10/156,618, filed on May 28, 2002, now Pat. No. 7,546,382.

(51) Int. Cl.
*G06F 15/16* (2006.01)

(52) U.S. Cl.
USPC .......................................... 709/219; 709/246

(58) Field of Classification Search
USPC .................................................. 709/219, 246
See application file for complete search history.

(56) References Cited

U.S. PATENT DOCUMENTS

| | | | |
|---|---|---|---|
| 5,748,841 A * | 5/1998 | Morin et al. ................... | 704/257 |
| 6,269,336 B1 | 7/2001 | Ladd et al. | |
| 6,385,583 B1 | 5/2002 | Ladd et al. | |
| 6,631,346 B1 * | 10/2003 | Karaorman et al. ............... | 704/9 |
| 6,717,593 B1 * | 4/2004 | Jennings ........................ | 715/760 |
| 7,003,463 B1 | 2/2006 | Maes et al. | |
| 7,167,830 B2 * | 1/2007 | Sravanapudi et al. ......... | 704/275 |
| 7,216,351 B1 | 5/2007 | Maes | |
| 7,219,305 B2 * | 5/2007 | Jennings ........................ | 715/761 |
| 7,487,440 B2 * | 2/2009 | Gergic et al. .................. | 715/234 |
| 7,519,536 B2 * | 4/2009 | Maes et al. ................... | 704/270.1 |
| 7,685,252 B1 * | 3/2010 | Maes et al. ..................... | 709/217 |
| 8,234,334 B2 * | 7/2012 | Reistad et al. ................. | 709/203 |
| 8,332,227 B2 * | 12/2012 | Maes et al. ................... | 704/270.1 |
| 2002/0003547 A1 * | 1/2002 | Wang et al. .................... | 345/727 |
| 2002/0007379 A1 * | 1/2002 | Wang et al. .................... | 707/515 |
| 2002/0174147 A1 * | 11/2002 | Wang et al. .................... | 707/513 |

(Continued)

FOREIGN PATENT DOCUMENTS

| | | |
|---|---|---|
| JP | 2001-056694 | 2/2001 |
| JP | 2001-159968 | 6/2001 |
| JP | 2001-166863 | 6/2001 |

OTHER PUBLICATIONS

K.A. Papineni et al., "Free-Flow Dialog Management Using Forms,", 4 pages, 1999.

(Continued)

*Primary Examiner* — Douglas Blair
(74) *Attorney, Agent, or Firm* — Anne V. Dougherty; Ryan, Mason & Lewis, LLP (57) ABSTRACT

Application authoring techniques, and information browsing mechanisms associated therewith, which employ programming in association with mixed-initiative multi-modal interactions and natural language understanding for use in dialog systems. Also, a conversational browsing architecture is provided for use with these and other authoring techniques.

19 Claims, 6 Drawing Sheets

(56) References Cited

U.S. PATENT DOCUMENTS

| | | | |
|---|---|---|---|
| 2002/0184373 A1* | 12/2002 | Maes | 709/228 |
| 2002/0194388 A1 | 12/2002 | Boloker et al. | |
| 2003/0145062 A1* | 7/2003 | Sharma et al. | 709/217 |
| 2008/0133702 A1* | 6/2008 | Sharma et al. | 709/217 |
| 2009/0287477 A1* | 11/2009 | Maes et al. | 704/201 |
| 2011/0225237 A1* | 9/2011 | Reistad et al. | 709/203 |
| 2012/0259921 A1* | 10/2012 | Reistad et al. | 709/204 |
| 2013/0006620 A1* | 1/2013 | Maes et al. | 704/231 |

OTHER PUBLICATIONS

K. Davies et al., "The IBM Conversational Telephony System for Financial Applications," 4 pages, 1999.

* cited by examiner

METHODS AND SYSTEMS FOR AUTHORING OF MIXED-INITIATIVE MULTI-MODAL INTERACTIONS AND RELATED BROWSING MECHANISMS

CROSS REFERENCE TO RELATED APPLICATIONS

This application is a divisional of pending U.S. application Ser. No. 10/156,618, filed May 28, 2002, the disclosure of which is incorporated by reference herein. The present application is related to the U.S. patent application identified as U.S. Ser. No. 09/544,823, filed on Apr. 6, 2000 and entitled "Methods and Systems for Multi-Modal Browsing and Implementation of a Conversational Markup Language," the disclosure of which is incorporated by reference herein.

FIELD OF THE INVENTION

The present invention generally relates to information access applications and dialog systems and, more particularly, to techniques for authoring of such applications in association with mixed-initiative multi-modal interactions and natural language understanding for use in such dialog systems, and to conversational browsing mechanisms.

BACKGROUND OF THE INVENTION

"Dialog system" is a phrase generally used to refer to a computer-based system or machine that permits a human to interact with one or more information accessing applications. "Application" is a term generally used to refer to one or more computer programs which perform or provide a function.

It is known that "mixed-initiative" dialog systems typically allow user responses to affect the behavior of the dialog system with which the user interacts. That is, mixed-initiative typically refers to the capability to manage dialogs that are partially or totally driven by the user, e.g., the user takes initiative and answers or expresses requests that are not necessarily directly related to the question asked by the application. Such mixed-initiative dialog systems also typically allow navigation between portions of an application in a non-sequential manner. A goal of such systems is to achieve rapid completion of a conversation between the user and the machine.

It is also known that "natural language understanding" (NLU) relates to the ability to interpret the intent/meaning of a user's input (i.e., semantic meaning).

Applications employing such concepts offer the most natural and flexible user interfaces and, thus, are key in making human-machine interaction more widely deployed and accepted.

However, in accordance with existing approaches, such applications which attempt to employ mixed-initiative dialogs or natural language understanding are almost exclusively written using an "imperative" programming language such as C, C++, Java, script, or combinations thereof. As is known, an imperative programming language is a programming language that requires the generation of traditional programming logic.

Unfortunately, the use of an imperative programming language restricts the development of such dialog systems and applications to developers who are experts in the imperative programming language. The use of imperative programming in the development of applications also may require many months of development and support.

On the other hand, it is known that "declarative" programming does not necessarily require the generation of the same type of traditional programming logic that imperative programming requires. However, declarative authoring using a markup language, such as VoiceXML (Voice Extensible Markup Language) for speech-enabled applications, has been mainly limited to directed dialog systems. As opposed to mixed-initiative dialog systems, directed dialog systems are strictly machine-driven. That is, the user must answer the prompts provided by the machine in a sequential manner until all the information the application needs to perform an action is gathered. Thus, with directed dialog systems, users can not interact with the application naturally, since interaction is restricted to a question/answer type session.

Accordingly, there is a need for application authoring techniques, and information browsing mechanisms associated therewith, which employ declarative and other programming in association with mixed-initiative multi-modal interactions and natural language understanding for use in dialog systems.

SUMMARY OF THE INVENTION

The present invention provides application authoring techniques, and information browsing mechanisms associated therewith, which employ programming in association with mixed-initiative multi-modal interactions and natural language understanding for use in dialog systems.

In one aspect of the invention, a method of generating an application accessible by a user in accordance with a dialog system comprises the step of representing interactions that the user may have with the dialog system as a data model and one or more user interaction elements that populate an application state of the data model and that are bound thereto, such that a dialog that the user has with the dialog system may be a mixed-initiative dialog. Further, in accordance with the application generating method, at least a portion of the one or more user interaction elements can be transformed or associated to one or more modality-specific renderings of the application which are presentable to the user and are selected or generated by a dialog manager algorithm.

In another aspect of the invention, a conversational browser apparatus for providing access to an application by a user comprises: an interaction manager; at least one modality based browser operatively coupled to the interaction manager, the modality based browser being a voice-based browser; and a dialog manager operatively coupled to the interaction manager. Interaction between the user, the interaction manager, the voice-based browser and the the dialog manager comprises: (i) the interaction manager obtains the application from a server in response to a user request, and passes a representation of the application to the dialog manager; (ii) the dialog manager determines at least one of a focus of the application and an intent of the user in accordance with the representation of the application, and informs the interaction manager of at least one of the focus of the application and the intent of the user; and (iii) the interaction manager then designates a particular portion (e.g., a snippet) of the application for presentation to the user in accordance with the voice-based browser based on the determination of at least one of the focus of the application and the intent of the user, the portion comprising at least a prompt and an input field, wherein the prompt is presented to the user and the input field specifies user input receivable in response to the prompt for use in redetermining at least one of the focus of the application and the intent of the user.

In yet another aspect of the invention, a conversational browser apparatus for providing access to an application by a user comprises an interaction manager function; at least one modality based browser function operatively coupled to the interaction manager; and a dialog manager operatively coupled to the interaction manager function. Interaction between the user, the interaction manager, the browser and the the dialog manager functions comprises: (i) the interaction manager obtains the application from a server in response to a user request, the application representing interactions that the user may have with the application as a data model and one or more user interaction elements that populate an application state of the data model and that are bound thereto; (ii) the dialog manager receives attribute value pairs generated from user input and processes the attribute value pairs to populate the data model and determine a next interaction focus; and (iii) upon determination of the next interaction focus by the dialog manager, the application state and context are updated and an output is generated by the interaction manager and provided to the user for interaction via the browser.

It is to be appreciated that the invention is generally applicable to any information access application regardless of the access protocol, modality, browser or device. In one embodiment, it is contemplated that the present invention (authoring and/or architecture aspects) may be applied directly to voice browsers and Voice Extensible Markup Language (VoiceXML). The inventive principles can apply to declarative or non-declarative conversational applications (or applications that mix declarative and non-declarative applications). Thus, the invention is more generally applicable to any information access situation in which it is desirable to provide programming in association with mixed-initiative multimodal (or voice-only) interactions and natural language understanding/free flow concepts.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 4A through 4C are a flow diagram illustrating an exchange of events in a dialog system according to an embodiment of the present invention.

DETAILED DESCRIPTION OF PREFERRED EMBODIMENTS

The following description will illustrate the invention using a preferred specification of IML (Interaction Markup Language), a preferred conversational browsing environment, and some exemplary applications for a better understanding of the invention. It should be understood, however, that the invention is not limited to these particular preferred implementations and exemplary applications.

It is to be understood that a dialog system that is "multimodal" is one which supports a variety of modes of interaction between the system and the user. Such modes of interaction may include, but are not limited to, speech, keyboard, handwriting, gesture, facial expression, context, affect, etc. Thus, while a user may input data to the dialog system in more than one mode (e.g., speech, text, etc.), the system may output data to the user in more than one mode using more than one interface or channel (e.g., speaker, graphical user interface, etc.). Further, it is to be understood that while this invention is illustratively described for multi-modal conversational applications, it can also be deployed for voice only interactions.

It is to be understood that natural language understanding (NLU) designates the capability to understand the meaning/intent behind a particular natural input of a user. Instead of simply recognizing a sentence constrained by grammars (i.e., by how the user is constrained in what he/she can say at a given moment) or just transcribing without understanding/interpretting what the user says (e.g., using stochastic grammars, i.e., language models), in the case of NLU, the system handles an input expressed in a free form manner in order to map this against a set of attributes and generate a set of value pairs that characterize the intent behind the input.

Further, mixed-initiative typically refers to the capability to manage dialogs that are partially or totally driven by the user: the user takes initiative and answers or expresses requests that are not necessarily directly related to the question asked by the application. The application must be able to understand the request and on that basis, execute the corresponding action (e.g., execute (fetch, submit, reserve, etc.) something or present an answer) or continue a dialog and collect more information, if appropriate. It is also possible that in order to progress, the application will have to perform disambiguation and canonicalization tasks to understand the user input and determine the focus, or even will need to start additional dialogs to enable confirmation or possible correction of the interpretation so far.

It is to be understood that the disambiguation task looks if a particular input, based on context, etc., is uniquely interpretable and makes sense (e.g., does one and only one flight exist at that time?). The canonicalizer maps different input into a canonical form meaningful for the applications (e.g., "next Tuesday," "May 29," "Tuesday" could be mapped on "5/29/02"). This typically requires application (business logic) specific code that knows what is meaningful for the rest of the application. Canonicalization is defined as the action to transform input attribute value pairs or context to be rendered into a standard and unambiguous format for the application.

Thus, in order to deploy mixed-initiative/free flow/conversational applications, it is necessary to be able to understand the intent of the user when he/she provides input. As free flow implies, somehow freedom must be given to the user. NLU is a natural way to accomplish this goal. NLU can be done relying on statistical methods as described in K. A. Papineni, "Free-flow Dialog Management Using Forms," Proc. Eurospeech, 1999; K. Davies et al., "The IBM Conversational Telephony System for Financial Applications," Proc. Eurospeech, Budapest, 1999, the disclosures of which are incorporated by reference herein. NLU can also be fabricated by building complex grammars that anticipate every possible ways that user can formulate his/her input.

The detailed description is divided into the following sections for ease of reference: (I) Declarative Application Authoring Techniques; and (II) Conversational Browser Architecture. Section I provides a detailed description of a preferred implementation of IML according to the invention. Section II provides a detailed description of a preferred conversational browsing environment that supports, parses and renders IML according to the invention.

I. Declarative Application Authoring Techniques

As will be explained in detail below, the invention enables the authoring of applications in a declarative XML (Extensible Markup Language) based programming language referred to as Interaction Markup Language or IML. It is to be understood that declarative programming employing IML may be directly implemented by one skilled in the art based on the detailed descriptions provided herein. However, it is also to be understood that IML may be implemented in accordance with the Conversational Markup Language (CML) described in the U.S. patent application identified as U.S. Ser. No. 09/544,823, filed on Apr. 6, 2000 and entitled "Methods and Systems for Multi-Modal Browsing and Implementation of a Conversational Markup Language," the disclosure of which is incorporated by reference herein, based on the detailed descriptions provided herein. It is also to be appreciated that other languages following similar principles can be used. Since syntax and semantics depend on the particular application, it is to be further appreciated that, given the inventive teachings herein, one of ordinary skill in the art will be able to generate appropriate syntax and semantics for one or more particular applications.

There are three components to application authoring in the IML framework: (i) the user interaction; (ii) the data model; and (iii) the presentation. The following describes each of these components and the relationships between them.

(i) User Interaction: Encoding the Essence of Conversations

In accordance with the invention, a conversational application is written in a declarative language designed to encode conversation at the highest level consistent across multiple modalities. Such a language allows application authors to program applications using interaction-based elements referred to herein as "conversational gestures." Conversational gestures are elementary programming components or elements of IML that characterize any dialog, independent of the modalities, the devices, or the browsers employed to access information associated with an application programmed in accordance therewith.

A set of primitive conversational gestures used to specify the behavior of the application may, for example, include "dialog," "message," "input," "select" and "submit." For example, each "message" or "input" that the system uses to present or collect data is simply defined and can be bound to information in a data model using XPath. To illustrate, the following is an excerpt from an application written for a travel-related dialog system:

```
<dialog name= "trip/air" action = "submit">
  <message>
    Welcome <value name= "trip/user/firstName"/>
    <value name= "trip/user/lastName"/>!
  </message>
  <input name= "arrivalCity">
    <grammar src= "travel.gram"/>
    <caption>Where will you be flying to?</caption>
  </input> . . .
  <submit target= "http://localhost/DB"/>
</dialog>
```

This example shows a "Welcome" message gesture bound to the firstName and lastName data model instance nodes for output presentation and an "arrivalCity" input gesture bound to the "arrivalCity" data model instance node. The message uses full XPath expressions such as "trip/user/firstName" while the input constructs the path "trip/air/arrivalCity" from both the binding in the nearest dialog gesture name="trip/air" and the binding inside the input gesture name="arrivalCity."

(ii) Data Model Specification

In a preferred implementation, a data model is specified in XML and is distinct from the presentation and the controller(s). The controller(s) here refers to the mechanism by which the user updates the models based on interactions, e.g., as will be explained below, this may include a dialog manager. This results in view updates. An example of a data model containing passenger and air travel information may be specified as:

```
<?xml version= "1.0?">
<trip>
  <user>
    <firstName/>
    <lastName/>
    <password/>
  </user>
  <air>
    <departureCity/>
    <departureDate/>
    <arrivalCity/>
    <returnDate/>
  </air>
</trip>
```

Each of the slots in this model, such as "firstName" and "departureCity," are populated through interaction with the user. The dialog structure is flexible and allows users to fill multiple slots, in various order, in a single interaction. As will be explained below, a dialog manager associated with the dialog system executing the application uses the data model to keep track of the conversation context to determine which slots have been filled with information from the user and which slots still need to be presented to complete the form.

(iii) Presentation Rules

Speech, text and gesture all serve as a means to the same end, but the presentation methods associated with each are inherently different. In a visual presentation, the application author may wish to have strict control over the spatial presentation of information. However, in speech conversation, the system needs to adapt to receive whatever information the user chooses to present and respond appropriately. Thus, in an embodiment of IML, XSLT (XSL transformation) rules are used to allow the author to specify the details of data presentation in a particular modality. Thus, with such a structure, IML allows information to be collected from the user in a flexible order across modalities. While XSLT and IML vocabulary are used in an illustrative embodiment, other transformation mechanisms and formats can be used.

With XSLT, for example, an IML application designer can specify the exact order, font, size, color and placement of visual data by including special tags in XSLT rules for HTML (HyperText Markup Language):

```
<xsl:template match= "dialog[@format_key= 'D2']">
  <p>I want the best round-trip travel:</p>
    <table><tr><td><b>From:</b></td>
      <td><xsl:apply-templates select= "input[@select_key= 'I4']"/>
      </td><td><b>To:</b></td>
      <td><xsl:apply-templates select= "input[@select_key= 'I5'"/>
      </td></tr> . . . </table> . . .
</xsl:template>
```

In addition, individual users with special needs may use special XSLT rules to show larger fonts, bigger buttons or to allow selection input through gesture or alternative input devices.

Presentation customizations are entirely separate from the interaction logic layer and the data model. As a result, a visual presentation may show as output particularly placed "From:" and "To:" fields, while the voice channel may say as output "Where would you like to go?" The separation of presentation from the underlying interaction logic also allows users the flexibility to express input in different ways through different modalities. For example, in accordance with a visual presentation of a travel application, the "From" field may be shown preceding the "To" field, since visually the user might think of a right to left line describing the trip. However, the user can still verbally express the information in whatever order he/she prefers, e.g., "I want a flight to New York, leaving from Boston." Since the gestures are synchronized and bound to the same data model using XPath, when the user speaks this response the information will appear in the reverse order in the appropriate fields of the HTML display.

It is to be appreciated that specifications of such well-known standards such as XSL, XSLT and XPath may be found on the W3C (World Wide Web Consortium) web site. However it is to be further appreciated that the invention does not rely on XSL or such associated transformations. The invention contemplates simply binding a presentation (or multiple presentations in multi-modal cases) to the data model (manually authored or pre-compiled). When focus is set on a particular portion of the dialog, the corresponding presentation is sent for the user to interact.

In a typical example, a VoiceXML snippet can be associated to each focus place in the application. This may comprise only of:

(i) A prompt as will be determined by the dialog manager (this may even be dynamically generated based on the focus and context); and (ii) An input field waiting for only one input. The associated data files specify the use of a NLU grammar. This implies that the voice browser uses NLU parsing (and language model for decoding/transcribing). This is to be understood as an extension of VoiceXML 2.0 (to understand such new grammar type) or as a reinterpretation of VoiceXML so that it supports LM (language model) and parsing when a Xgrammar is specified.

(iv) IML Applications

Thus, in accordance with the invention and as detailed above, an IML application includes an application state, modeled via an XML schema, and user interaction elements (i.e., conversational gestures) used to populate this application state. The application state captures rich type information, e.g., value of the field "departureDate" is of type "date." The application also captures higher-level semantic relationships such as a relationship requiring that the field "arrivalDate" not precede "departureDate." User interaction elements in IML bind to the underlying application state, and produce rich user interaction based on the underlying type constraints modeled by the application state.

Further, as will be detailed below, type constraints and cross-field constraints encapsulated in the application state are used as input to a natural language understanding (NLU) engine in order to assist in creation of appropriate disambiguation dialogs via a dialog manager. Still further, the state of the values stored in the application state at any given time, combined with the associated model constraints, and the interpretation of user intent as expressed via multiple modalities of input (e.g., speech, gestures, etc.), are combined by the dialog manager in determining the next stage of the conversation between the user and the dialog system.

Thus, mixed-initiative IML dialogs are achieved in accordance with the present invention by:

(1) Modeling the application state along with its type and cross-field constraints.

(2) Continuously maintaining and updating the application state as represented in an IML interpreter. Application state, at any given dialog turn, contains the slots currently filled by the user, as well as those filled by the application backend, if any.

(3) Passing the user's utterances to an NLU engine to extract semantic meaning.

(4) Using contextual knowledge present in the application state along with the semantic meaning returned by the NLU engine to permit rich, context-sensitive interpretation of the user utterance. As will be illustrated below, this can be achieved by passing the application state and the result of the NLU engine to a dialog manager.

(5) Using the contextual interpretation to decide which portion of the dialog gets traversed next and update the application state. In an architecture that includes a dialog manager, the focus determination may be the result of the dialog manager's contextual interpretation.

(6) A list of defined events in IML enhanced to incorporate NLU events, provide the IML author a mechanism to attach appropriate event handlers to these events. Such events include parser event, request for canonicalization and disambiguation, results from disambiguation and canonicalization, slot update or updates to data model from dialog management canonicalization, disambiguation or other external source, submission of context, update to dialog (e.g., load a sub-dialog for confirmation, correction, help, etc.). More events are provided and explained below.

(7) Through enhanced IML, the application author may specify navigation inside the application, thus forcing a focus shift based on either the current application state or the result of a generated event.

Advantageously, IML provides declarative authoring of the application state and its associated constraints. Further, IML leverages such constraints as input to a NLU engine. Thus, the NLU engine is one more source of input in the dialog system used for the purpose of interpreting user intent.

These and other features and advantages realized via declarative programming in accordance with the invention will be further evident based on a description of implementations of inventive conversational browser architectures which support, parse and render IML, to be presented in the section below.

II. Conversational Browser Architecture

Figure 1:
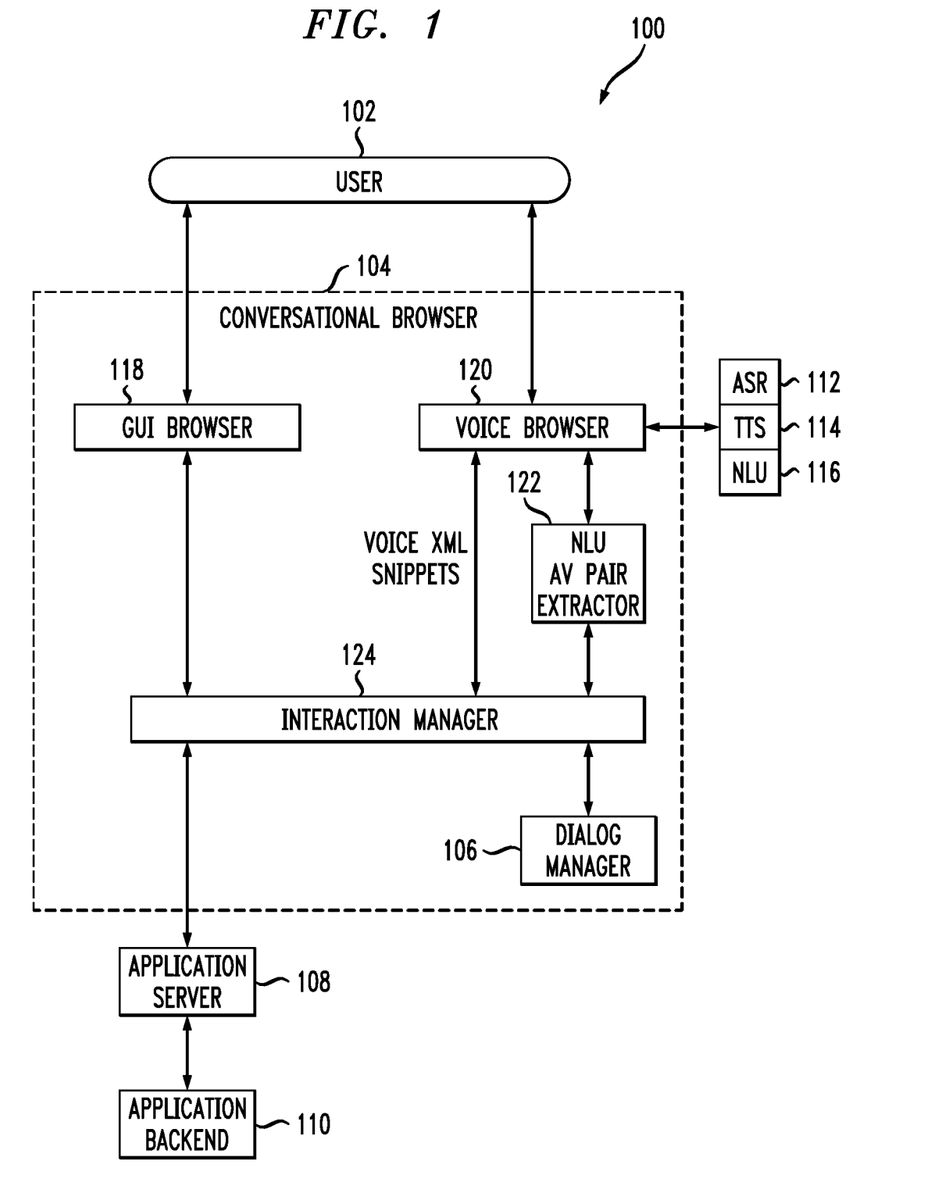
FIG. 1 is a a block diagram illustrating a dialog system capable of supporting IML applications according to an embodiment of the present invention.

Referring now to FIG. 1, a block diagram illustrates a dialog system capable of supporting IML applications according to an embodiment of the present invention. As shown, a dialog system 100 with which a user 102 interacts comprises a conversational browser 104, an application server 108, an application backend 110, an automatic speech recognition (ASR) engine 112, a text-to-speech (TTS) engine 114 and a natural language understanding (NLU) engine 116. The conversational browser 104, itself, comprises a dialog manager 106, a graphical user interface (GUI) browser 118, a voice browser 120, an NLU attribute value (AV) pair extractor 122 and an interaction manager 124. It is to be appreciated that the dialog manager 106 may alternatively be an integral part of the interaction manager 124 or may even be separate from the conversational browser itself. Also, it is to be appreciated that the GUI browser is only included in a multi-modal embodiment. Further, other modalities may be used instead of those provided by the GUI browser.

The dialog system 100 permits the user 102 to interact via mixed-initiative/free flow dialogs with one or more applications associated with content servers such as application server 108. The components of the dialog system may be connected via an appropriate network. The invention is not limited to any particular network and therefore may, for example, be wireless, hardwired, local area, wide area, etc. In one embodiment, the network is the World Wide Web or Internet. In another embodiment, the network may be an Intranet. Also, the dialog system may be connected across several networks, for example: (i) wireless network (e.g., between blocks 102 and 120 or blocks 120 and 124); (ii) a public switched telephone network or PSTN (e.g., between blocks 102 and 120); (iii) Internet (e.g., between blocks 118 and 124 or blocks 102 and 120, etc.); and (iv) Intranet (e.g., between blocks 120 and 124 and behind block 124).

It is to be understood that while the conversational browser 104 depicts the use of two interaction modalities; vision/text entry (GUI browser component 118) and speech (voice browser component 120), the invention is not limited to these modalities. Also, it is to be understood that by the term "browser," it is meant to refer generally to one or more computer programs that permit a user to interact with data. Thus, GUI browsers providing capabilities similar to those provided by well-known HTML browsers such as Microsoft's Internet Explorer may be employed. Examples of voice or speech browsers that may be employed include IBM Corporation's VoiceXML Browser which is part of the Websphere Voice Server.

The conversational browser 104 is preferably implemented, in whole or in part, on a client device of the user 102. For example, the client device may be a personal computer, a laptop computer, a personal digital assistant, a cellular phone, include a regular telephone, etc. However, it is to be understood that the conversational browser 104 may be implemented over multiple devices, including both client and server computer systems.

The engines 112, 114 and 116 may also be implemented on the client device. Thus, the dialog system 100 is in the form of a client/server architecture. However, it is to be understood that the invention is not limited to such an architecture. Rather, individual components of the dialog system may be implemented on individual computer systems connected in a suitable manner. Some examples of such configurations are disclosed in the U.S. patent application identified as Ser. No. 09/507,526 filed on Feb. 18, 2000; in the U.S. patent application identified as Ser. No. 09/544,823 filed on Apr. 6, 2000; and in the U.S. patent application identified by Express Mail No. EL797416042US Ser. No. 10/007,092 filed on Dec. 4, 2001 and entitled "Systems and Methods for Implementing Modular DOM-Based Multi-Modal Browsers," which claims priority to the provisional U.S. patent application identified as Ser. No. 06/251,085 filed on Dec. 4, 2000, the disclosures of which are incorporated by reference herein.

In general, the user 102 interfaces with the dialog system 100 via a textual and/or graphic interface (GUI based input/output devices—e.g., display, keyboard, mouse, etc.), and/or the interface can be via speech (audio input/output devices—e.g., microphone, speaker, etc.) associated with the client device. These input/output devices provide the physical mechanisms for the modality specific browsers (GUI browser 118 and voice browser 120) to receive input from the user data and present output data to the user during the course of the dialog that occurs in accordance with the accessed application. The inputs are abstracted into events through each modality/device specific view. Output events and instructions are provided to the user through the presentation rendered by these browsers. It is possible to consider other architectures where the browsers are not explicitly present; but input results into input events and output events are transformed into output for the user.

Based on the user's request, the conversational browser 104 sends an appropriate URI (uniform resource identifier) to the application server 108 (content server) in order to request access to the particular desired application. IML code associated with the application, generated in accordance with the inventive principles explained above in section I, is then downloaded from the application server 108 to the conversational browser 104. The conversational browser 104 then generates the modality specific renderings, e.g., GUI representation and/or speech representation, (or gets them bound to the data model if they have been manually authored or pre-compiled) when they are based on the interaction elements (e.g., conversational gestures) associated with the IML code. The user thus interacts with the conversational browser 104 via these representations.

Given the illustrative architecture depicted in FIG. 1, various detailed features and interactions associated with the components of the dialog system will now be described.

(i) Mixed-Initiative Conversational Browsing

The conversational browser 104 accepts input and renders output simultaneously (concurrently or sequentially) available in various modalities or devices, e.g., speech (e.g., VoiceXML), Wireless Application Protocol or WAP (e.g., Extensible HTML Mobile Profile or XHTML-MP and Wireless Markup Language or WML) and GUI (e.g. XHTML). It is to be understood that other devices or modalities may be added in the same way.

The mixed-initiative dialog manager 106 allows the user 102 to choose how to navigate an application and the order in which to complete tasks, as opposed to a directed dialog mode, as explained above in the background section, that forces the user to perform tasks and provide information in a predetermined order (e.g., machine-driven spoken dialogs). The interaction manager 124 allows the user to proceed in a more natural conversational manner that smoothly merges simultaneous interaction in different modalities while preserving the freedom of navigation. History of interactions are exploited to understand and disambiguate the intent of the user.

In accordance with the invention, the interaction manager 124 communicates the user's input abstractly (i.e., independently of the modality), as well as relevant modality specific information, if any, to the dialog manager 106, which then disambiguates and interprets the user interaction and, if needed, initiates a new interaction dialog to help better understand the intent or to offer a possibility to confirm or correct the interpretation. The conversational browser preferably employs a document object model (DOM) based model-view-controller (MVC) approach, as will be explained below.

In the embodiment illustrated in FIG. 1, the interaction manager 124 controls the GUI browser 118 and the voice browser 120. As mentioned above, each component or subcomponent of the conversational browser 104 can be local or distributed with respect to one another. In one embodiment, the interaction manager 124 may be implemented as a multi-modal shell as described in the U.S. patent application identified as Ser. No. 09/507,526 filed on Feb. 18, 2000; and in the U.S. patent application identified as Ser. No. 09/544,823 filed on Apr. 6, 2000.

The interaction manager 124 receives interaction events (DOM events or authored events) that capture the user's input from either the GUI browser 118 or the voice browser 120 and renders output to the respective browsers in appropriate modalities by updating the presentation in each of the appropriate browsers.

In accordance with the invention, the application is authored in IML and transcoded into the appropriate modality when rendering in one of the browser views. As explained above, instead of transcoding, upon determination of the focus, it is possible to use a presentation bound to the data model (e.g., pre-authored or compiled VoiceXML snippets). Other authoring approaches can be employed with this architecture. In particular, presentations suited for each target channel can be manually authored and bound to IML data models with synchronization information.

The interaction manager 124 and the dialog manager 106 maintain DOM tree representations of the user interaction logic layer that abstractly describes the user interaction and the data model manipulated by the user through this interaction. This DOM representation can be shared between the dialog manager 106 and the interaction manager 124 if they are implemented as an integral component of the system. A dialog gesture corresponds to a specific logical task and is also called a "form." Each form may comprise several "input gestures" to collect the information needed to complete a task. The data collected by the input gestures is stored in the data model. Each input gesture corresponds to a "slot" in the form. An IML application may comprise several forms. A further example of application code is provided below.

The mixed-initiative dialog manager 106 performs tasks according to the user's request. Unlike directed dialog schemes where the computer maintains control over the dialog, the mixed-initiative dialog manager 106 does not know a priori which task a user's input is directed towards. One of the main functions of the dialog manager 106 is to infer the slot and form the user's input is most suitable for. The dialog manager 106 does this by matching user input and assigning a score to each form to find the top scoring form.

It may take several turns in the conversation to collect all the information required to complete any one task. In an airline reservation application, several pieces of information may have to be collected from the user, such as departure city, arrival city, departure time, etc. The user may say that he wants to go to Boston the next day. In this case, the user would have to be prompted for missing information such as where he is leaving from, what time would he like to leave, etc. The user may also switch between various tasks at any time, such as checking his frequent flier miles while making a reservation. The dialog manager 106 therefore models user intention and switches to the appropriate task in this instance to help the user complete the query. The information provided by the user may also be ambiguous, and therefore, the dialog manager 106 disambiguates the dialog. When contradictory, or blatantly wrong, the dialog manager 106 switches to the appropriate task to seek correction, clarification or confirmation.

Another important function of the dialog manager 106 is focus determination or specifying the next turn in the conversation. Focus determination may require that the dialog manager prompt for input and/or disambiguate an input. The dialog manager 106 drives the conversation intelligently based on previous interactions with the user. Although the dialog manager 106 sets the focus for the next turn in the conversation, the dialog manager 106 does not constrain the user to that particular task or sub-task.

Another feature of the dialog manager 106 is that it is event driven. That is, the dialog manager 106 communicates with the interaction manager 124 and the application server 108 and its application backend (business logic) 110 via DOM events. Both the interaction manager 124 and the dialog manager 106 maintain DOM based tree representations of the application. DOM events are used to communicate changes in the tree between the dialog manager 106 and the interaction manager 124.

Application specific information is stored and interpreted by the application server 108 in accordance with its backend 110. Communication between the dialog manager 106 and the application is also conducted through DOM events and is routed via the interaction manager 124. Such exchanges include canonicalization and disambiguation requests, as will be explained below.

The GUI browser 118 and voice browser 120 provide input/output functionality, i.e., they render presentations with which the user can interact. The interaction manager 124 synchronizes the rendering of output between the GUI browser 118 and the voice browser 120 and maintains the state of the interaction logic layer, i.e., state of the interaction and data model manipulated by the user. The interaction manager 124 also performs the transcoding needed to render the IML application in the appropriate modality such as XHTML or VoiceXML or selects the presentation already bound to the data model in accordance with the focus determined and communicated by the dialog manager 106. The interaction manager 124 also serves as the communication channel between with the dialog manager 106 and the application business logic 110 associated with the application server 108 and beyond in databases.

The ASR engine 112 receives input from the user and transcribes it into a string (or text) relying on its speech data files (acoustic models, baseforms, grammars or language model) specified in the VoiceXML snippet, as described below. In particular, in a preferred embodiment, the ASR engine relies on a stochastic grammar (language model) to produce a transcription of the input (results of speech recognition). It is possible that the ASR results be annotated with additional meta-information (scores, N-best lists etc.) In another embodiment, speech recognition results may be exchanged in Natural Language Semantics Markup Language (NLSML).

The recognized text is then passed to the NLU parser 116 that calls and tags the results based on its NL data models. Example of this technology are discussed in K. A. Papineni, "Free-flow Dialog Management Using Forms," Proc. Eurospeech, 1999 and K. Davies et al., "The IBM Conversational Telephony System for Financial Applications," Proc. Eurospeech, Budapest, 1999, the disclosures of which are incorporated by reference herein.

Similarly, when voice prompts are presented to the user, this is done through the VoiceXML snippets described below. The snippet prescribes what prompt to play and how to get it. The snippet may point to a pre-recorded prompt or provide the text to be synthesized via TTS engine 114. The text may be described with Speech Synthesis Markup Language or SSML. NLSML and SSML are described on the W3C web site. The voice browser fetches and plays the prompt, and controls the TTS engine to generate the audio to play to the user.

The voice browser uses application programming interfaces (APIs) to control the engines 112, 114 and 116. When the engines are distributed, the APIs may be transported by remote control protocols for example as disclosed in the U.S. patent application identified as Ser. No. 09/806,425 filed on Jun. 25, 2001 which is a national stage filing based on PCT application US99/22925 filed Oct. 1, 1999 which claims priority to the provisional U.S. patent applications identified as Ser. No. 60/102,957 filed on Oct. 2, 1998 and Ser. No. 60/117,595 filed on Jan. 27, 1999, the disclosures of which are incorporated by reference herein.

Other engines may be involved (e.g., speaker recognition) and the same mechanisms can be used for other modalities that result in engines for processing input or output (adapted to the specificity of the modalities, e.g., video processing or handwriting). Note that the text used to generate voice prompts can itself be automatically generated from the context, focus and application, instead of being merely specified by the application once the dialog manager determines the focus. In such case, the information to convey to the user is presented as attribute value pairs, which may be annotated. These are also examples of exchanges that may be represented in NLSML and that are then assembled into a natural human sentence or set of sentences via NLG (Natural Language Generation) technology.

The NLU AV pair extractor 122 parses and classes the elements of a voice input into attribute value (AV) pairs designed for the particular target application and understood by the data model as well as the dialog manager 106. Classification and parsing relies on a statistical classer and a parser model. Natural Language Semantics Markup Language (NLSML) may be used as the format for exchanging the attribute value pairs, possibly annotated.

(ii) VoiceXML Snippets

In accordance with the invention, rather than transcoding an entire (or portions of) IML authored application associated with the application into VoiceXML for rendering in accordance with the voice browser 120, only a snippet of VoiceXML is generated or selected. A "snippet" comprises a prompt to provide to the user, an input field to collect input from the user, and a submit instruction to submit the completed form to the interaction manager 124. The prompt describes if it is to play back a pre-recorded prompt or synthesize a text and, in this case, provide the VoiceXML instructions to do so. The input field is associated with the VoiceXML instructions to control the ASR, transcribe the speech input and pass it to the NL parser. This is done by extending VoiceXML with an NL grammar tag that designates the NL parser data files to use. It can also be done by modifying the VoiceXML runtime to always involve the NL parser. This mechanism allows to circumvent the constraints of the VoiceXML form interpretation algorithm and lets the interaction manager/dialog manager determine the focus of the application and next dialog instead of relying on the VoiceXML form interpretation algorithm to do so.

Thus, the interaction manager 124 generates or selects VoiceXML snippets that contain only the next prompt, an input field with a well-scoped grammar (e.g., a language model, i.e., a statistical grammar or a grammar built on the different grammars to keep in scope), and the submit instruction. The interaction manager 124 provides fine control of the prompts and input. Use of VoiceXML snippets will be further illustrated below.

In this approach, the voice browser is the voice interface to the engines and audio input/output (I/O). But the dialog management is performed abstractly one layer behind (and possibly independently of the modalities). Again, the VoiceXML snippets may be generated via transcoding or selected based on the focus in a set of pre-compiled or manually authored snippets bound to the IML document.

In other modalities, the interaction manager 124 may generate bigger snippets (i.e., corresponding to more gestures than the immediate prompt under focus). For example, in XHTML, it may make sense to generate a menu of the different tasks that can be active at the same time (on top of or in another frame) and the currently partially filled task is displayed with focus on the prompt and input field expected to be filled based on the determined focus. This is only one possible way to do this. Alternative methods are contemplated by the invention.

(iii) IML Applications and DOM Representations

As previously explained, IML provides a device independent means of authoring an application. The interaction manager 124 transcodes and renders output to the voice or GUI browsers as appropriate. The interaction manager 124 also specifies a clear separation among adapted presentations, the interaction logic layer and the business logic and data layers. The interaction manager 124 and the dialog manager 106 maintain DOM tree representations of the user interaction and the data manipulated by the user.

The following is a simple example of a user interaction expressed in IML:

```
<?xml version="1.0" encoding="ISO-8859-1"?>
<html name="travel" version="1.0"> <head>
<model id="TravelDetails">
<trip>
<userInfo>
<name/>
</userInfo>
....more details
</trip>
</model ></head><body>
<iml name="travel" version="1.0">
<iml:model-ref id="TravelDetails" src="travel_all.xml"/>
<iml:instance name="trip" type="TravelDetails"/>
<iml:interaction node_id = "I1" ...>
<iml:dialog node_id="D1" name="trip/userinfo" ...>
<iml :message node_id="M1">
Welcome to our flight information system.
<iml:/message>
<iml:input name="name">
<iml:caption node_id="C0">
Please enter your name
</iml :caption>
</iml :input>
</iml :dialog>
</iml:interaction>
</body></html>
```

The data collected from user interaction is stored in the data model in the header of the XHTML container. The binding between the user interaction DOM and the data model DOM is performed at run time.

Figure 2:
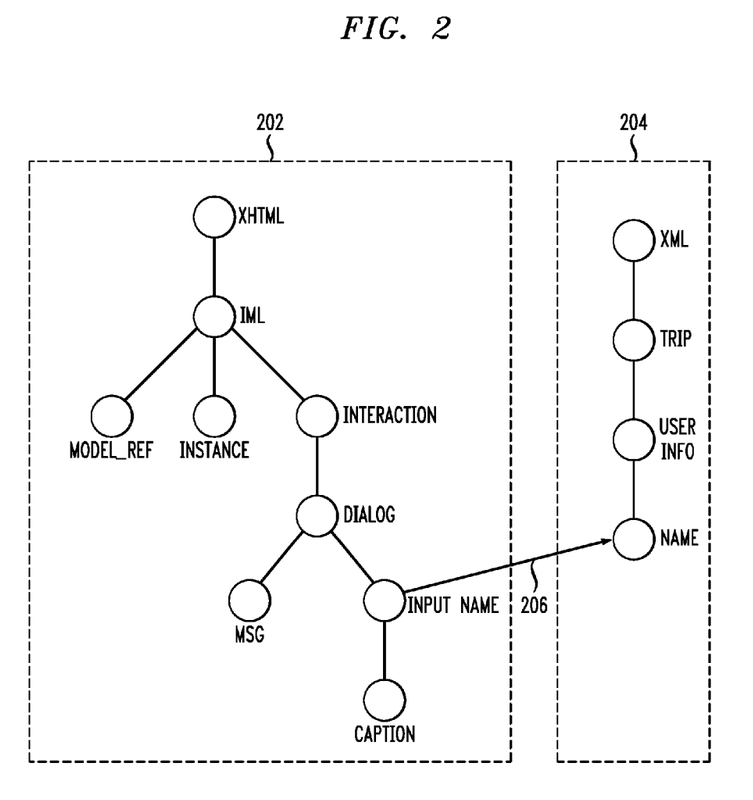
FIG. 2 is a diagram illustrating interaction and data model document object model tree representations according to an embodiment of the present invention.

Referring now to FIG. 2, illustrative interaction and data model DOM tree representations are depicted for the sample IML code above. As shown, an interaction DOM tree representation 202 is bound to a data model DOM representation 204 via binding 206.

(iv) Event Driven, Form-Based Dialog Manager

The task of the dialog manager 106 is to drive the interaction with the user in an intelligent manner. The dialog manager 106 models the user intention at every turn and assists the user in performing tasks.

One of the main functions of the dialog manager 104 is to match user input with the appropriate form and slot (i.e., determine the focus of the input). User input received by the conversational browser 104 is parsed by the NLU AV pair extractor 122 to generate attribute value (AV) pairs containing the semantic information gathered from the user utterance (possibly annotated with other collected or inferred information). The attribute value pairs are received by the interaction manager 124 from the extractor 122 and passed as events to the dialog manager 106. The dialog manager 106 accepts these attribute value pairs as input from the conversational browser 104 as a "parser event."

The dialog manager 106 scores each attribute value pair against each form and determines the top scoring form. By way of one example, scoring may be decided based on the scoring algorithm described in the above-referenced K. Papineni reference. A default generic algorithm is typically provided by the dialog manager. Each form however can point to a new algorithm or to new parameters for the algorithm. For example, this can be done by pointing to Java classes and/or XML arguments for the scoring algorithm. In a preferred embodiment, the dialog manager supports such "plug-ins" and the application can associate to each dialog form a pointer to a scoring algorithm other than the default one or point/include other parameter settings.

The dialog manager 106 applies the values from the attribute value pairs to the appropriate slots of the top scoring form. The dialog manager 106 conveys the information regarding the change in the value of a slot to interaction manager 124 as a "slot mutation event" that results in an update of the data model.

Another important function of the dialog manager 106 is focus determination (for the next output (the previous discussion was about focus for the last input)) or specifying the next turn in the conversation to intelligently drive the conversation with the user. Based on prior interactions with the user, the dialog manager 106 determines where the focus of the conversation should be. It may be that the user has to be prompted for more information to complete a task, the user has switched between tasks and user interaction should proceed accordingly, or clarification, correction or confirmation of user input is required. The dialog manager 106 determines where the focus should be in the user interaction and conveys this information to the interaction manager in a "focus event." Again, this is based on a default algorithm that can be specified by the dialog manager algorithm and overwritten. As explained below, the focus may point to a new sub-dialog that results from the disambiguation with the application (the disambiguation updates the IML application and, possibly, the data model, and provides the dialog manager with a focus on the new sub-dialog).

Preferably, the dialog manager 106 itself does not contain application-specific knowledge. All the application-specific knowledge, including disambiguation of ambiguous information, as well as the decision to disambiguate an input is the responsibility of the application business logic that runs in accordance with the application server 108. The application developer specifies if user input has to be disambiguated by associating a "canonicalize gesture" with an input gesture. The presence of a canonicalize gesture indicates that the application developer wants the data to be rendered into a standard and unambiguous format.

When the dialog manager 106 receives user input in the form of an attribute value pair, the dialog manager 106 checks if the interaction specifies that the input is to be disambiguated. If so, the dialog manager 106 conveys the information to the interaction manager 124 in the form of a "canonicalization event." The interaction manager 124 conveys the canonicalization request to the application business logic and conveys the results of the disambiguation from the application back to the dialog manager 106 as a "canonicalizer response event." The dialog manager 106 uses this information to determine if the user input is valid, or if further clarification is needed and shifts focus accordingly.

When the dialog manager 106 determines that all slots necessary for completing a task are filled, the dialog manager 106 indicates this to the interaction manager 124 via a "back-end submit event." The results of the backend request are conveyed back to the dialog manager 106 by the interaction manager 124 as a "backend submit response event." If the backend request completes successfully, the dialog manager 106 marks a form as complete, and proceeds to the next one. If the backend request fails, the dialog manager 106 shifts focus to the interaction node for handling the error, e.g., the node in the IML user interface DOM tree where an error correction dialog is provided.

Given a list of attribute value pairs, the dialog manager 106 applies a simple scoring strategy to determine the most suitable form for the input. The dialog manager 106 takes into account the number of matching attributes and slots, which form has focus currently, context and histories (long term and short term), etc. The dialog manager 106 is designed to allow application-specific as well as new scoring strategies that can be plugged in. The dialog manager 106 can also handle dialog management across multiple independently-developed applications.

Disambiguation with knowledge sources can be achieved by submitting partially filled data models and hypotheses (deferred data model updates) as attribute value pairs for validation by the knowledge source (e.g., is a return date valid, if earlier transactions involved a later departure date; does a particular transaction type exist, etc.).

Dialog management relies on any available information. Additional information about the attribute value pairs can be useful (e.g., confidence levels, N-best list of values, alternate attributes etc.).

In the data model of the invention, the scoring strategy may be a single (or multiple) default of the dialog manager or be indicated explicitly by a form that points to a plug-in dialog manager strategy. This may be just parametrization of the (or one of the) default strategy or with respect to another one. The parametrization can be done in XML. Imperatively, script or other strategies can be also introduced by pointing to a form specific and application specific plug-in authored (e.g., in Java) to handle this. The invention may employ a two pass scoring strategy. In the first pass, the dialog that can use the interpreted input is determined. If more than one dialog is selected during the first pass, arbitration is performed between them in a second pass. The invention also provides a canonicalization service to communicate with the application servlet (e.g., application server 108 in FIG. 1) for canonicalization/disambiguation. The dialog manager will expect the application servlet to return either a unique canonicalized value, a failure indication, sub-dialogs or data model updates.

Sub-dialog may be present in the original application or be returned as an update to the application that has focus by the web application server when it turns out that the current dialog state is ambiguous, requires more details, confirmation or correction.

As mentioned, an application is authored in IML and consists of a set of interactions and a data model. The servlets provide the canonicalization/disambiguation facility. The dynamic generation of a sub-dialog for purposes of disambiguation works as follows. The servlet will try to canonicalize the input it has received, upon failing to do so, it will generate a sub-dialog to clarify the input. When the sub-dialog receives user input it will call the servlet that created the sub-dialog for (re)canonicalization. The canonicalized input will be returned to the dialog manager.

Example (1) User: "I want to go to Springfield"
(2) The dialog manager 106 asks for canonicalization on (arrivalCity, Springfield).
(3) The servlet determines there is more than one Springfield and generates a sub-dialog that asks "Do you mean Springfield, Mass. or Springfield, Ill." The sub-dialog will accept user responses such as "Illinois," "Massachusetts" or "the second one."
(4) The sub-dialog will send (arrivalCity, Springfield-Mass.) back to the servlet.
(5) The servlet will successfully canonicalize (arrivalCity, Springfield-Mass.) and return the canonicalized value to the dialog manager (or interaction manager depending on routing scheme)

The sub-dialog may receive unconstrained input and so it may send (arrivalCity, Springfield-Garbage) to the servlet. The servlet will then determine that canonicalization has failed and respond accordingly to the dialog manager.

(v) Interaction Between the Interaction Manager and the Dialog Manager

As mentioned above, the dialog manager 106 communicates with the interaction manager 124 through DOM events. Consistent with the IML authoring techniques described herein, the application comprises a set of user interactions and a data model. Both the interaction manager 124 and the dialog manager 106 maintain DOM tree representations of the user interaction and the data.

The dialog manager 106 sends the following events to the interaction manager 124: (1) focus events (to inform the interaction manager 124 of the next step in the interaction); (2) slot mutation events (to inform the interaction manager 124 of changes of data model variables); and (3) canonicalization events (disambiguation requests to the application via the interaction manager 124), backend submit events (to indicate to the interaction manager 124 that a particular instance or form should be sent to the application server 108 to update the application state and possibly the interaction). A backend submit event corresponds to a conventional HTTP page submit. It is to be understood that the backend submit event can also be to a local business logic on the same system on which the conversational browser resides.

The dialog manager 106 is registered as an event listener on the interaction tree for the following events: (1) parser events that contain the attribute value pairs derived from user input; (2) canonicalizer response events that contain the results of disambiguation of user input; (3) backend submit response events that indicate if a backend request has completed successfully or not; (4) GUI focus events that indicate if the focus has been set explicitly by the user via the GUI browser 118; and (5) slot mutation events from the GUI browser 118 that contain updated data model values that the interaction manager 124 has received from the GUI browser 118.

Thus, as is evident from the above explanation, the exchanges between the application server 108, the dialog manager 106 and the interaction manager 124 of the dialog system 100 comprise sequences of these events. However, the invention is not restricted to communication via sequences of events.

Note also that it is possible to enable the reuse of dialogs (forms) to let the user provide information about a new request inherited from a similar previous one (e.g., return leg in an air travel reservation). This can be done by enabling indexing of the data model and IML interaction gestures and by adding information in the "plug-in" associated to the form that specifies how inheritance and management of two or multiple versions of the form and data model should be treated.

Figure 3:
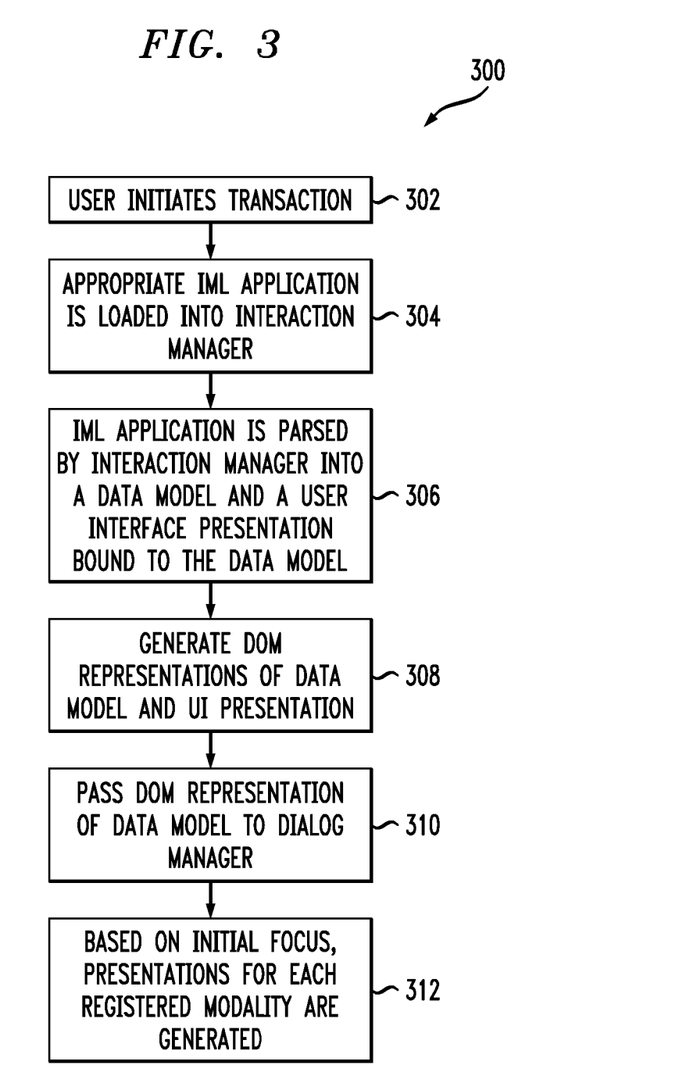
FIG. 3 is a flow diagram illustrating an overall flow of initial operations associated with a dialog system according to an embodiment of the present invention.
Figure 4A:
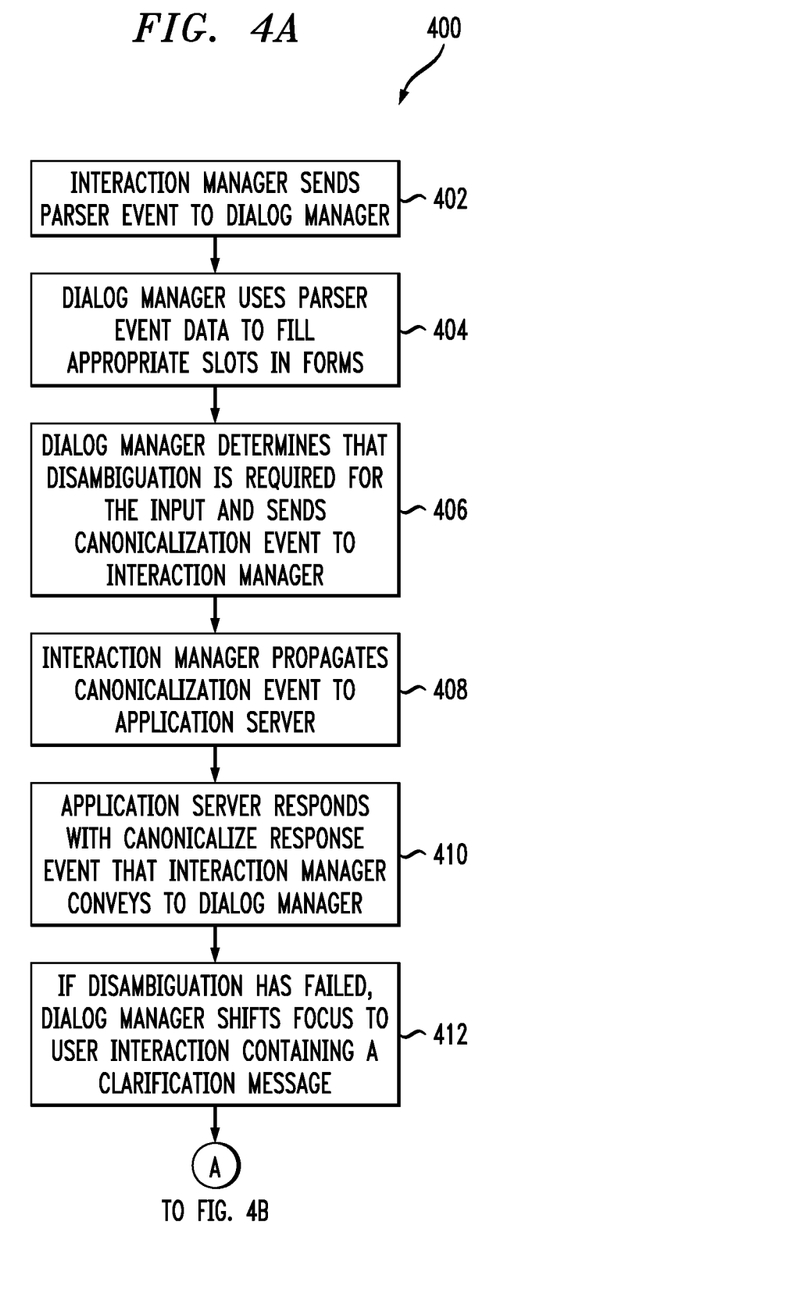
Figure 4B:
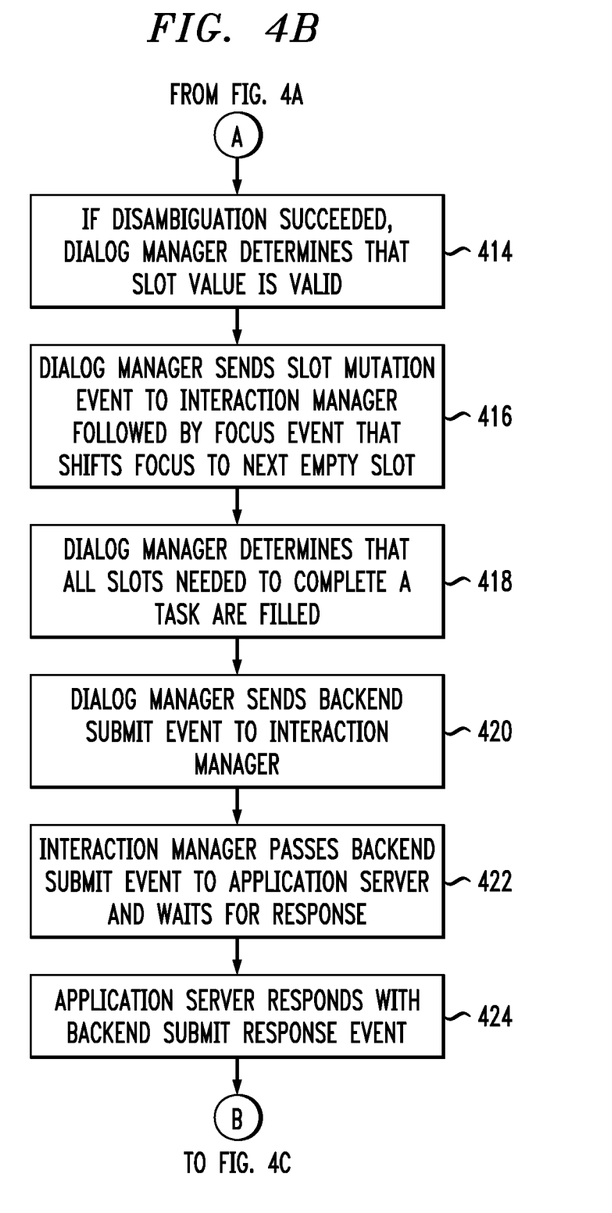
Figure 4C:
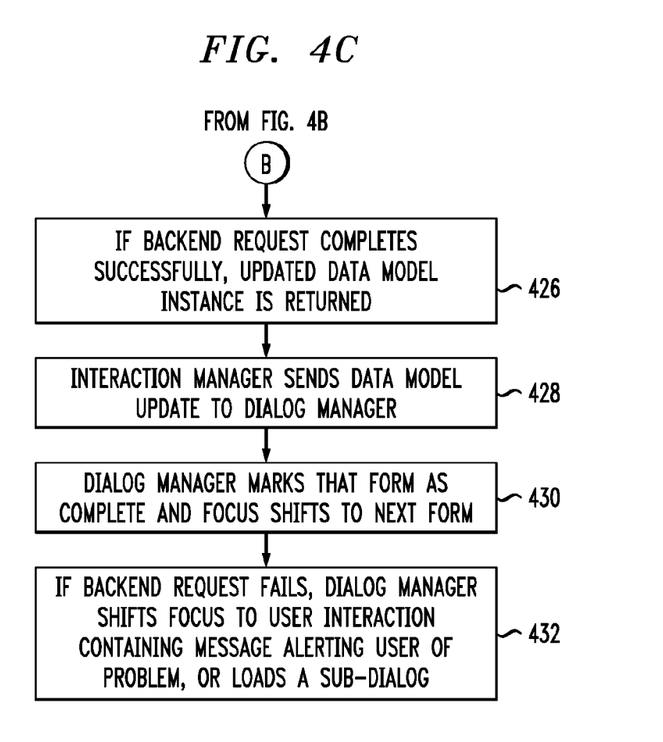

Before illustrating an example of event exchanges associated with the components of a dialog system according to the invention in the context of FIGS. 4A through 4C, a flow diagram illustrating initial operation flow is provided in FIG. 3.

Referring now to FIG. 3, a flow diagram illustrates an overall flow 300 of initial operations associated with a dialog system according to an embodiment of the present invention.

Initially, the user initiates a transaction (e.g., requests access to an application associated with a content server) in step 302. As a result of the transaction initiated by the user, an appropriate application (IML code) is loaded into the interaction manager 124 in step 304. It is to be understood that a user request may be generated in a variety of ways depending on the application that the dialog system 100 is performing. Some examples of the ways in which a request may be initiated are as follows.

In telephony type applications performed by dialog systems, it is possible that the application is dedicated to searching for a phone number of a party that the user is trying to reach. For example, this is the case in an IVR (Interactive Voice Response) application or a "welcome" menu of a voice portal type application. In these cases, the appropriate IML application is loaded into the interaction manager 124 when the dialog system is instantiated or when the dialog system is assigned a telephony port.

In more general cases, including voice portals, the GUI and/or voice browser is first instantiated and, within the GUI browser or voice browser, the user selects a particular URI to a conversational application. The associated IML page(s) is then loaded into the interaction manager 124.

It is also possible, at the start of a user transaction, that only a GUI or voice browser is present for the user and that the instantiation and connection to the interaction manager results from the selection of the application via a URL. In some cases, this may result from selecting a shortcut/application on a device used or accessed by the user.

In any case, the IML application is parsed by the interaction manager 124 into a data model and a user interface (UI) presentation (or an "interaction" as described above) bound to the data model, in step 306. In step 308, respective DOM (document object model) based representations of the data model and the UI presentation are then generated. The DOM based representations are preferably in a tree format (e.g., FIG. 2). The DOM based representation of the UI presentation may be in an abstract form for subsequent presentation rendering in the final target form or may be a presentation in a final target form bound to the data model, e.g., XHTML (Extensible HTML), XHTML-Mobile, WML (Wireless Markup Language), VoiceXML, XHTML+Voice, etc.

In step 310, the interaction manager 124 passes a replication of the DOM representation of the data model to the dialog manager 106 for use in accordance therewith, as has been described herein. In an embodiment where the interaction manager and the dialog manager are implemented as a common component, they may share the same DOM representations.

Based on the initial focus, in step 312, the presentations (final renderings) for each modality are generated. That is, some part of the requested application is presented to the user via the GUI browser 118 and/or the voice browser 120.

Referring now to FIGS. 4A through 4C, a flow diagram illustrates an exchange of events in a dialog system according to an embodiment of the present invention.

In step 402, the interaction manager 124 sends a parser event to the dialog manager 106. The parser event contains the attribute value pairs generated by the NLU extractor 122 from the semantic representation of the user's utterance. In step 404, the dialog manager 106 uses this information to fill appropriate slots.

In step 406, the dialog manager 106 determines that disambiguation is required for the input. The dialog manager 106 sends a canonicalization event to the interaction manager 124. In step 408, the interaction manager 124 propagates the event to the application server 108.

In step 410, the application server 108 responds with a canonicalize response event that the interaction manager 124 conveys to the dialog manager 106. If the disambiguation has failed, the dialog manager 106 shifts focus, in step 412, to the user interaction containing the clarification message. If the disambiguation has succeeded, the dialog manager 106 determines the slot value is valid, in step 414. The dialog manager 106 sends a slot mutation event to the interaction manager 124, followed by a focus event that shifts focus to the next empty slot, in step 416.

Assuming disambiguation has succeeded, the dialog manager 106 determines that all slots needed to complete a task are filled, in step 418. Then, in step 420, the dialog manager 106 sends a backend submit event to the interaction manager 124.

In step 422, the interaction manager 124 passes the event to the application server 108 and waits for a response. The application server 108 responds with a backend submit response event, in step 424.

If the backend request, such as database request, completes successfully, an updated data model instance is returned, in step 426, to the interaction manager 124. The interaction manager 124 then sends the data model update to the dialog manager 106, in step 428. The dialog manager 106 then marks that form as complete and focus shifts to the next form, in step 430. If a backend request fails, the dialog manager 106 shifts focus to the user interaction containing a message alerting the user of the problem, or loads a sub-dialog, in step 432.

The interaction manager 124 also informs the dialog manager 106 of user input the interaction manager 124 has received from the GUI browser 118. If the user 102 explicitly set focus via the GUI browser 118, the interaction manager 124 sends the dialog manager 106 a GUI focus event. Slot mutation events are sent by the interaction manager 124 to the dialog manager 106 in response to slot updates from the GUI browser 118. This allows the dialog manager 106 to synchronize its state with the interaction manager 124.

Figure 5:
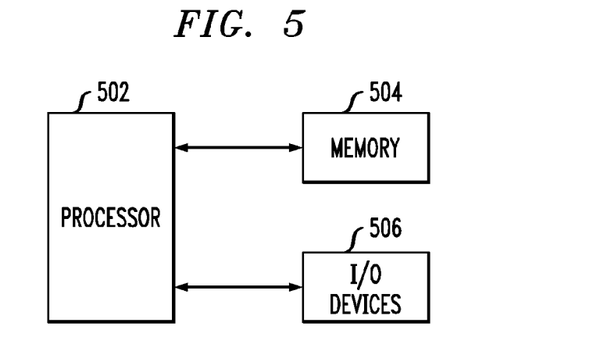
FIG. 5 is a block diagram illustrating a generalized hardware architecture of a computer system suitable for implementing the various functional components of a dialog system according to an embodiment of the present invention.

Referring now to FIG. 5, a block diagram is shown illustrating a generalized hardware architecture of a computer system suitable for implementing the various functional components of a dialog system as depicted in the figures and explained in detail herein. It is to be understood that the individual components of the dialog system, e.g., as illustrated in FIG. 1, may be implemented on one such computer system, or more preferably, on more than one such computer system, e.g., where the conversational browser 104, ASR engine 112, TTS engine 114, and NLU engine 116 are implemented on one or more client devices having the architecture of FIG. 5, and the application server 108 and associated backend 110 are implemented on one or more server systems having the architecture of FIG. 5.

As shown, the computer system may be implemented in accordance with a processor 502, a memory 504 and I/O devices 506. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more modality-specific input devices (e.g., camera, microphone, keyboard, mouse, etc.) for entering data to the processing unit, and/or one or more modality-specific output devices (e.g., speaker, display, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. By way of example, because VoiceXML is also built off forms, it is possible to implement an evolution of VoiceXML where i.e., VoiceXML is considerd as IML: (1) the grammars are extended to support language models and NL grammars that rely on NL parsers+AV extractor; (2) add reference to a scoring/disambiguation algorithm to select the fields that have been filled by input and determine the next focus.

What is claimed is:

1. A conversational browser apparatus for providing access to an application by a user, the apparatus comprising:
   a processor; and
   a memory for storing program instructions that are executed by the processor for implementing:
   an interaction manager;
   at least one modality based browser operatively coupled to the interaction manager, the modality based browser being a voice-based browser; and
   a dialog, manager operatively coupled to the interaction manager;
   wherein interaction between the user, the interaction manager, the voice-based browser and the dialog manager comprises:
   (i) the interaction manager obtains the application from a server in response to a user request and passes a representation of the application to the dialog manger;
   (ii) the dialog manager determines a focus of the application and an intent of the user in accordance with the representation of the application, and informs the interaction manager of at least one of the focus of the application and the intent of the user;
   (iii) the interaction manager then designates a particular portion of the application for presentation to the user in accordance with the voice-based browser based on the determination of at least one of the focus of the application and the intent of the user, the portion comprising at least a prompt and an input field, wherein the prompt is presented to the user and the input field specifies user input receivable in response to the prompt for use in predetermining at least one of the focus of the application and the intent of the user;

(iv) the interaction manager parses the application into a data model and one or more user interaction elements that are bound to the data model, and (v) the dialog manager manages mixed-initiative dialog interaction between the user and the application by populating an application state of the data model through interaction with the user, wherein populating the application state comprises filling one or more slots of a form, in any order, in a single user interaction, and wherein the dialog manager uses the data model to keep track of a conversation context to determine which slots of the form have been filled with information from the user and which slots of the form need to be resented to the user to complete the form.

2. The apparatus of claim 1, wherein the interaction manager parses the application into a data model and one or more user interaction elements bound to the data model, generates a document object model (DOM) representation of at least the data model, and passes the DOM representation of the data model to the dialog manager.

3. The apparatus of claim 1, wherein the memory further stores program instructions that are executed by the processor for implementing a natural language attribute value (AV) pair extractor operatively coupled between the voice-based browser and the interaction manager for extracting AV pairs associated with one or more user utterances for use by the dialog manager in determining at least one of the focus of the application and the intent of the user.

4. The apparatus of claim 1, wherein the designated portion further comprises a submit instruction to submit a result of the user input to the interaction manager.

5. The apparatus of claim 1, wherein the designated portion specifies a type of processing, to be performed in accordance with at least one of the prompt and the user input.

6. The apparatus of claim 1, wherein the dialog manager operates independent of modalities.

7. The apparatus of claim 1, wherein the application server attempts to disambiguate an original user input provided thereto and, upon failing to do so, generates a sub-dialog to attempt to clarify the input such that the application server can reattempt to disambiguate the original user input based on additional input received from the user in response to the sub-dialog.

8. The apparatus of claim 1, wherein the designated portion is a Voice Extensible Markup Language (VoiceXML) snippet.

9. The apparatus of claim 1, wherein a menu is presented in an Extensible HyperText Markup Language (XHTML) frame or as part of a page of the application.

10. The apparatus of claim 1, wherein the voice-based browser supports Voice Extensible Markup Language (VoiceXML).

11. The apparatus of claim 1, wherein the memory further stores program instructions that are executed by the processor for implementing a graphical user interface (GUI) based browser operatively coupled to the interaction manager for providing the use with the ability to interact with the application via, at least a second modality.

12. The apparatus of claim 1, wherein communication between the interaction manager, the dialog manager and the application server is event-based.

13. The apparatus of claim 1, wherein a prompt is generated via a natural language generation (NLG) technique.

14. The apparatus of claim 1, wherein the application comprises forms and the dialog manager scores attribute value pairs generated from user input against each form and determines a top scoring form.

15. The apparatus of claim 1, wherein populating the application state by the dialog manager comprises:
    scoring each of the one or more user interaction elements against one or more slots of each of a plurality of forms in accordance with a scoring algorithm;
    selecting at least one of the plurality of forms to represent the application state based at least in pan on the scoring; and
    populating the one or more slots of the selected form by the one or more user interaction elements in accordance with the user's interaction with the dialog system.

16. A conversational browser apparatus for providing access to an application by a user, the apparatus comprising:
    a processor; and
    a memory for storing program instructions that are executed by the processor for implementing;
        an interaction manager;
        at least one modality based browser operatively coupled to the interaction manager; and
        a dialog manager operatively coupled to the interaction manager;
    wherein interaction between the user, the interaction manager, the browser and the dialog manager comprises:
        (i) the interaction manager obtains the application from a server in response to a user request, the application representing interactions that the user may have with the application as a data model and one or more user interaction elements that populate an application state of the data model and that are bound thereto;
        (ii) the dialog manager receives attribute value pairs generated from user input and processes the attribute value pairs to populate the data model and determine a next interaction focus, wherein the dialog manager manages mixed-initiative dialog interaction between the user and the application by populating the application state of the data model through interaction with the user, wherein populating the application state comprises using the attribute value pairs to fill one or more slots of a form, in any order, in a single user interaction, and wherein the dialog manager uses the data model to keep track of the conversation context to determine which slots of the form have been filled with information from the user and which slots of the form need to be presented to the user to complete the form; and
        (iii) upon determination of the next interaction focus by the dialog manager, the application state and context are updated and an output is generated by the interaction manager and provided to the user for interaction via the browser.

17. The apparatus of claim 16, wherein populating the application state by the dialog manager comprises:
    scoring each attribute value pair against each of a plurality of forms in accordance with a scoring algorithm;
    selecting at least one of the plurality of forms to represent the application state based at least in part on the scoring; and
    populating the one or more slots of the selected form with values from the attribute value pairs in accordance with the user's interaction with the dialog system.

18. A method of authoring an application accessible by a user in accordance with a conversational browser, the method comprising the steps of:
    an interaction manager of the conversational browser obtaining the application from a server in response to a user request, the application representing interactions that the user may have with the application as a data model and one or more user interaction elements that populate an application state of the data model and that are bound thereto;

a dialog manager of the conversational browser managing mixed-initiative dialog interaction between the user and the application, wherein the dialog manager manages mixed-initiative dialog by receiving attribute value pairs generated from user input and processing the attribute value pairs to populate an application state of the data model and determine a next interaction focus, wherein populating the application state comprises using the attribute value pairs to fill one or more slots of a form, in any order, in a single user interaction, and wherein the dialog manager uses the data model to keep track of the conversation context to determine which slots of the form have been filled with information from the user and which slots of the form need to be presented to the user to complete the form; and upon determination of the next interaction focus by the dialog manager, the application state and context being updated and an output being generated by the interaction manager and provided to the user for interaction via a browsing mechanism of the conversational browser.

19. The method of claim 18, wherein populating the application state by the dialog manager comprises:

scoring each attribute value pair against each of a plurality of forms in accordance with a scoring algorithm;

selecting at least one of the plurality of forms to represent the application state based at least in part on the scoring; and populating the one or more slots of the selected form with values from the attribute value pairs in accordance with the user's interaction with the dialog system.

* * * * *